UNITED STATES PATENT OFFICE.

HENRY MATHEY, OF NEW YORK, N. Y., ASSIGNOR TO JOSE F. NAVARRO, OF SAME PLACE.

MANUFACTURE OF HYDRAULIC CEMENT.

SPECIFICATION forming part of Letters Patent No. 343,182, dated June 8, 1886.

Application filed March 27, 1886. Serial No. 196,843. (No specimens.)

*To all whom it may concern:*

Be it known that I, HENRY MATHEY, a citizen of the United States, residing at New York, in the county of New York, State of New York, have invented certain new and useful Improvements in the Manufacture of Hydraulic Cement, of which the following is a specification.

My invention relates to improvements in the manufacture of cement from argillaceous limestone. These are generally termed "natural-cement rock," for the reason that when properly burned or calcined the resultant product will set under water.

Heretofore the natural-cement rock, after quarrying, underwent a practical selection or sorting at the quarry, and the sorted material conveyed to vertical kilns, where it was burned. Notwithstanding such sorting at the quarry, it is very difficult to obtain a uniform cement-rock, and as mistakes occur in the selection, the resulting cement constantly varies in quality. Moreover, it is at once apparent that the supposed refuse which is thrown aside as waste often and usually does contain excellent stone which could be utilized for the manufacture of cement.

It is a well-known fact (as set out by Vicat, Rivot, Reid, and Gilmore) that the best hydraulic cements owe their high quality of hydraulicity to the double silicates of lime and alumina formed during the burning. All natural-cement rock in the United States is deficient in alumina, and consequently the cement made does not contain enough double silicates to materially improve its setting quality and its ultimate strength.

In Letters Patent granted me April 13, 1886, No. 339,673, the cement-rock has been ground previous to burning. It is apparent that by the old methods of burning in vertical kilns no alluvial clay could be added to the rock, for the reason that it would choke up the draft. Moreover, as the rock must be in large pieces in said vertical kilns, (to provide a draft,) there could not be that requisite ultimate contact between the clay and rock during the burning. Now, by my process I take the natural-cement rock, crush it to a uniform degree of fineness—say to a fineness that will pass through a No. 4 to 8 mesh screen, or a screen having sixteen or sixty-four openings to the square inch. Now, I propose by my present process to treat natural or ordinary cement rock in the same way as in the manufacture of Portland cement. Therefore, instead of limestone and clay, I propose to use natural-cement rock and clay, and to accomplish this purpose I proceed as follows: The natural-cement rock, after being crushed as described, is analyzed to ascertain its exact composition. I then add the necessary amount of clay for the formation of the double silicates during the operation of calcination. After the clay is thoroughly dried, it is crushed to the fineness of the stone and then added to the rock, and their ultimate mixture is made by means of proper apparatus for the purpose. This mixture is then fed into the revolving cylinder described in Letters Patent No. 325,259, September 1, 1885. The cement obtained has been found by experiment to be quick-setting and to possess great strength and tenacity.

It is also well known that many quarries of limestone have been abandoned because the stone, when burned, does not possess hydraulicity, owing to a deficiency in silica. In my process, by adding the clay, I also bring in this element, (silica,) which is the most active and necessary element in the formation of silicates of lime and alumina.

In the United States excellent clays are found which show by analysis about eighty per cent. of silica of alumina, the proportion being about fifty-six per cent. of silica to twenty-five per cent. of alumina. Therefore it will be seen that by the addition of clay to the cement-rock before burning, I obtain all the elements necessary to the formation of perfect hydraulic cement. Again, by this process dolomite or deposits of magnesian limestone can also be made available and produce an excellent cement. Clay is much cheaper to obtain and easier to handle than rock; hence I obtain by my process an element which not only increases the quantity of cement for a given amount of stone, but also greatly decreases the cost in manufacture.

Having thus described my invention, what

I claim, and desire to secure by Letters Patent, is—

The process of manufacturing hydraulic cement, which consists in first crushing the natural-cement rock to a suitable degree of fineness, then adding to this raw material alumina and silica in the form of alluvial clay, next mixing together these elements, and finally burning them under agitation to form the double silicates of lime and alumina.

In testimony whereof I affix my signature in presence of two witnesses.

HENRY MATHEY.

Witnesses:
JOHN T. ARMS,
W. C. ALVORD.